United States Patent [19]
Fujii et al.

[11] Patent Number: 4,798,946
[45] Date of Patent: Jan. 17, 1989

[54] PLASTIC PACKAGE FOR AN IC CARD

[75] Inventors: Noriaki Fujii; Mamoru Kitamura, both of Itami; Akira Yamada, Amagasaki, all of Japan

[73] Assignee: Mitsubishi Denki Kabushiki Kaisha, Japan

[21] Appl. No.: 151,982

[22] Filed: Feb. 3, 1988

[30] Foreign Application Priority Data

Apr. 9, 1987 [JP] Japan .................................. 62-87802
Sep. 17, 1987 [JP] Japan ................................ 62-230982

[51] Int. Cl.$^4$ ............................................ G06K 19/06
[52] U.S. Cl. ...................................... 235/492; 235/487
[58] Field of Search .................................. 235/487, 492

[56] References Cited

U.S. PATENT DOCUMENTS 4,222,516  9/1980  Badet .................................. 235/492

Primary Examiner—Harold I. Pitts
Attorney, Agent, or Firm—Leydig, Voit & Mayer

[57] ABSTRACT

A plastic package for an IC card comprises a first package section and a section package section, both of which have a flat base and a rim which extends around the periphery of the base and projects therefrom. A groove is formed in the rim of the first package section, and a projection which fits into the groove is formed in the rim of the second package section. A bonding agent is applied to the inside of the groove, and the two package sections are combined with the top surfaces of the rims abutting and the projection inserted into the groove. In one form of the invention, the groove is preferably larger than the projection by an amount sufficient to prevent bonding agent from being forced out of the groove. In another form of the invention, grooves for storing bonding agent which overflows from the grooves are formed in the top surface of one of the rims on either side of the groove and projection.

16 Claims, 3 Drawing Sheets

FIG. 1  PRIOR ART
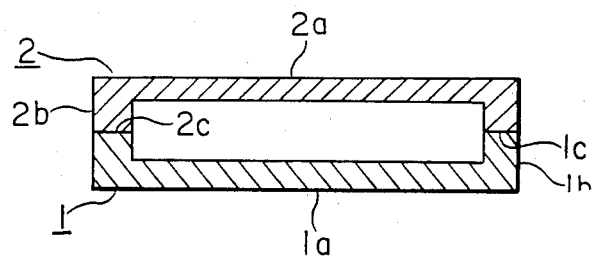
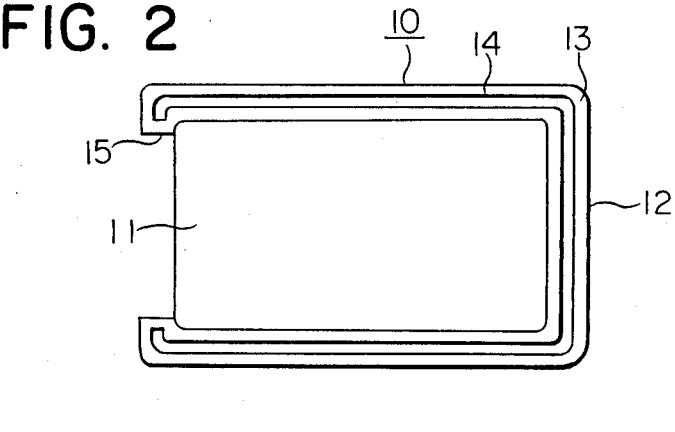
FIG. 3
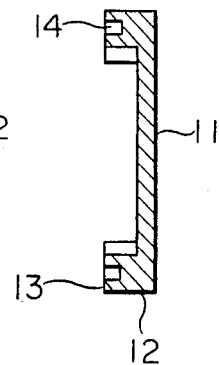
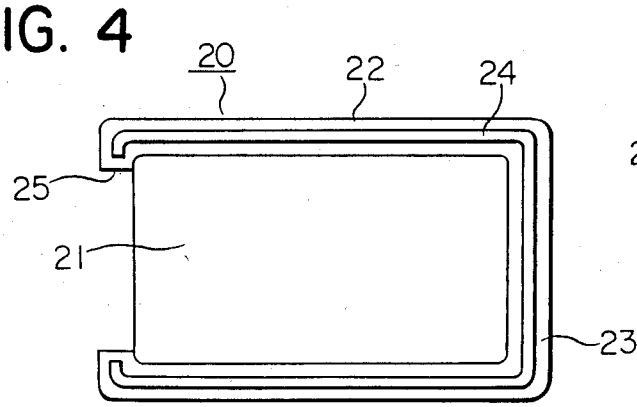
FIG. 5
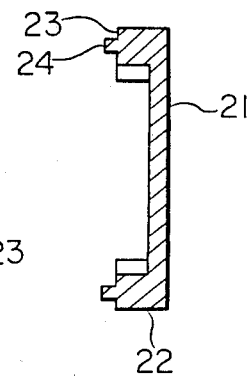
FIG. 6
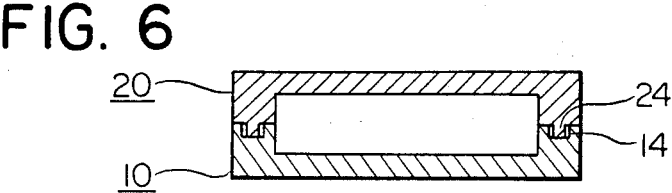

PLASTIC PACKAGE FOR AN IC CARD

BACKGROUND OF THE INVENTION

This invention relates to a plastic package for an IC card which houses an integrated circuit which is used for storing information.

FIG. 1 is a transverse cross-sectional view of a conventional plastic package for an IC card. As shown in this figure, the plastic package comprises a first package section 1 and a second package section 2, both of which have a C-shaped transverse cross section. The first package section 1 comprises a flat base 1a and a rim 1b which projects upwards from the top surface of the base 1a and extends around three sides of the flat base 1. Similarly, the second package section comprises a flat base 2a and a rim 2b which projects downwards from the bottom surface of the flat base 2a and extends around three sides of its periphery. The two package sections 1 and 2 are bonded to one another with the top surface 1c of the rim 1b of the first package section 1 in intimate contact with the top surface 2c of the rim 2b of the second package section 2.

Bonding of the two package sections to one another is generally performed in either of two ways. One method is to first uniformly apply a bonding agent to the entirety of the top surfaces 1c and 2c and then combine the two package sections 1 and 2 with one another as shown in FIG. 1. Another method is to first combine the two package sections as shown in the figure and then apply a bonding agent to the outside of the two packages along the dividing line between their top surfaces. The bonding agent penetrates between the confronting top surfaces and bonds them together.

When the first method of bonding is employed, an adequate amount of binding agent can be applied to the top surfaces 1c and 2c, thereby ensuring a reliable joint between the two package sections. However, when the two package sections are combined with one another, the bonding agent tends to be forced from between the top surfaces 1c and 2c towards the inside or the outside of the package. If the bonding agent enters the inside of the package, the reliability of the IC card can be adversely affected. If the bonding agent is instead forced to the outside of the package, it disfigures the appearance of the package, which is also undesirable. Furthermore, the process of uniformly coating the top surfaces 1c and 2c with bonding agent is time-consuming.

On the other hand, when the second method of applying a bonding agent to the outside of the package is employed, there is considerable variation in the extent to which the bonding agent penetrates along the confronting surfaces of the package sections, and a uniform bond is not formed. Furthermore, bonding requires a large amount of time, and the outer periphery of the package becomes dirty from the bonding agent.

Whichever of these two methods is used, with a conventional plastic package, the two package sections can easily move out of alignment with one another during bonding. Ensuring that the outer surfaces of the package sections remain flush with one another further increases the difficulty of bonding operations.

SUMMARY OF THE INVENTION

Accordingly, it is an object of the present invention to provide a plastic package for an IC card which can be manufactured without a bonding agent entering into the plastic package when the package is assembled.

It is another object of the present invention to provide a plastic package for an IC card whose exterior is not disfigured by a bonding agent during its manufacture.

It is yet another object of the present invention to provide a plastic package for an IC card which can be easily and quickly manufactured.

A plastic package for an IC card in accordance with the present invention comprises a first package section and a second package section which are combined together to form a space for housing an IC board which contains an IC storage device. Each package section comprises a flat base and a rim which projects perpendicularly from one side of the base and extends around the periphery of the base along at least three sides thereof. The top surface of the rim of the first package section has a first engaging portion formed therein which comprises at least one depression, and the top surface of the rim of the second package section has a second engaging portion formed therein which comprises at least one projection which can fit into a corresponding depression of the first engaging portion of the first package section. The two package sections are joined to one another by applying a bonding agent to the depression of the first package section and then combining the two package sections so that the two engaging portions mate with one another and the top surfaces of both rims are in intimate contact. When the engaging portions are combined, the bonding agent remains within the depression of the first engaging portion and is not forced to the inside or the outside of the plastic package.

In a preferred embodiment, the first engaging projection comprises a single, rectangular groove which extends continuously along the length of the rim of the first package section, and the second engaging portion comprises a single, rectangular projection which extends continuously along the length of the rim of the second package section. However, as long as the engaging portions of the first and second package sections can mate with one another, there is no restriction on their exact shape. Furthermore, each engaging portion may comprise both depressions and grooves which engage with corresponding grooves and depressions of the other engaging portion.

Preferably, the dimensions of the depressions of the engaging portions are larger than those of the projections so that when the two package sections are combined with one another, a gap will be left between at least one portion of the projection and the corresponding depression and the bonding agent will not be forced out of the projection.

BRIEF DESCRIPTION OF THE DRAWINGS

FIG. 1 is a transverse cross-sectional view of a conventional plastic package for an IC card.

FIG. 2 is a plan view of a first package section of a first embodiment of a plastic package for an IC card in accordance with the present invention.

FIG. 3 is a transverse cross-sectional view of the first package section of FIG. 2.

FIG. 4 is a plan view of a second package section which is combined with the first package section of FIG. 2.

FIG. 5 is a transverse cross-sectional view of the second package section of FIG. 4.

FIG. 6 is a transverse cross-sectional view of the first and second package sections when joined with one another.

In the drawings, the same reference numerals indicate the same or corresponding parts.

DESCRIPTION OF THE PREFERRED EMBODIMENTS

Figure 7:
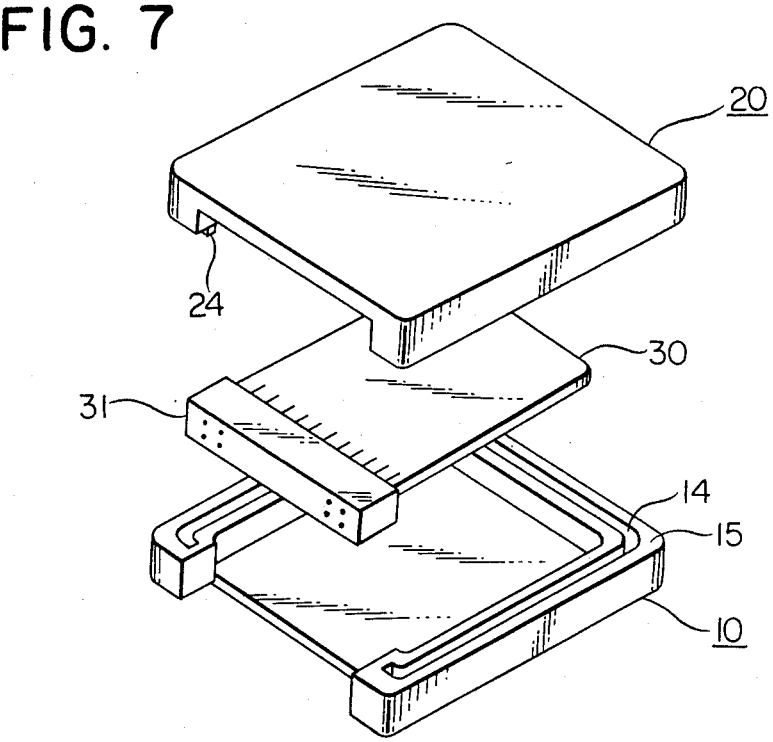
FIG. 7 is an exploded perspective view of an IC card employing the embodiment of FIG. 6.

Hereinbelow, a number of preferred embodiments of a plastic package for an IC card in accordance with the present invention will be described while referring to the accompanying drawings. FIGS. 2 through 7 of which illustrate a first embodiment. This embodiment of a plastic package comprises a first package section 10 and a second package section 20 which are joined with one another by bonding. As shown in FIGS. 2 and 3, which are respectively a plan view and a transverse cross-sectional view, the first package section 10 has a flat, rectangular base 11 and a rim 12 which projects from one surface of the base 11 and extends around the periphery of the base 11 on three sides in roughly the shape of a C. The rim 12 has a uniform height. A first engaging portion in the form of a rectangular groove 14 is formed in the top surface 13 of the rim 12 and extends continuously for substantially its entire length. The opposite ends of the rim extend part of the way along the fourth side of the base 11 but are separated by a gap into which an unillustrated electrical connector is inserted. The two end surfaces 15 of the rim 12 confront one another and support the sides of the connector.

As shown in FIGS. 4 and 5, which are respectively a plan view and a transverse cross-sectional view, the second package section 20 has a similar structure. It comprises a flat, rectangular base 21 and a rim 22 which projects from one surface of the base 21 and extends around three sides of its periphery in roughly the shape of a C. A second engaging portion in the form of a rectangular projection 24 which can fit into the groove 14 of the first package section 10 is formed in the top surface 23 of the rim 22. The projection 24 extends continuously along the rim 22 for the same length as the groove 14. The two end surfaces 25 of the rim 22 confront one another from opposite ends of the fourth side of the base 21 and cooperate with the end surfaces 15 of rim 12 to support the unillustrated connector.

FIG. 6 is a transverse cross-sectional view illustrating the state in which the two package sections 10 and 20 are combined with one another. The projection 24 of the second package section 20 fits into the groove 14 of the first package section 10, and the top surfaces 13 and 23 of the two rims 12 and 22 are in intimate contact with one another.

FIG. 7 is an exploded view of an assembled IC card employing a plastic package of the present invention. An IC board 30 fits into the space between the confronting surfaces of the flat bases 11 and 21 and the inner peripheries of the rims 12 and 22. A connector 31 which is secured to one end of the IC board 30 is held by the end surfaces 15 and 25 of the rims 12 and 22.

When assembling an IC card employing a plastic package of the present invention, a suitable amount of a bonding agent is first applied to the inside of the groove 14 of the first package section 10. The IC board 30 and the connector 31 are then inserted into the first package section 10 with the end surfaces of the connector 31 held by the end surfaces 15 of the rim 12 of the first package section 10. The second package section 20 is then stacked on top of the first package section 10 with the projection 24 fitting into the groove 14 and with the top surfaces 13 and 23 of the rims in intimate contact with one another. The bonding agent fills the space between the inner surface of the groove 14 and the outer surface of the projection 24 and is not forced outwards to the top surfaces 13 and 23 of the rims.

Accordingly, bonding agent is not forced either into the inside of the package where the IC board 30 is housed or to the outer surface of the package. Therefore, the IC board 30 is not affected by the bonding agent and the outer surface of the package is not disfigured. It is not necessary to apply a uniform coating to the top surfaces of the rims of the package sections as with a conventional plastic package. It is only necessary to apply a suitable amount of bonding agent to the inside of the groove 14. Furthermore, the groove 14 and the projection 24 aid in the positioning of the package sections and prevent them from moving out of alignment during bonding. Therefore, the time required for bonding can be decreased.

Figure 8:
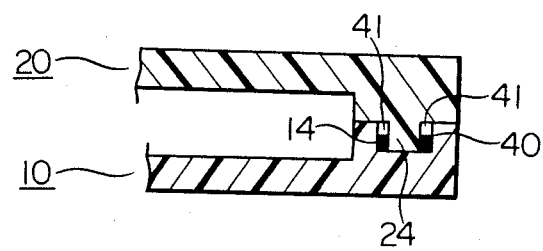
FIG. 8 is a transverse cross-sectional view of a portion of a second embodiment of the present invention.

In order to ensure that the bonding agent will not be forced out of the groove 14 of the first package section 10 onto the top surfaces 13 and 23 of the rims, the dimensions of the groove 14 are preferably chosen such that a gap is left between at least one surface of the groove 14 and the projection 24. Such a gap serves as a reservoir for bonding agent which is displaced when the projection 24 is inserted into the groove 14. FIG. 8 illustrates a portion of a second embodiment of the present invention in which the width of the groove 14 in the first package section 10 is larger than the width of the projection 24 of the second package section 20 so that when the projection 24 is inserted into the groove 14, gaps 41 will be left between both sides of the groove 14 and the projection 24. The height of the projection 24 is equal to the depth of the groove 14 so that the end surface of the projection 24 will be in intimate contact with the bottom surface of the groove 14. When the two package sections are combined as shown in the figure, bonding agent 40 which was previously applied to the inside of the groove 14 and is displaced by the projection 24 remains within the gaps 41 instead of being forced to the outside of the groove 14. The structure of this embodiment is otherwise identical to that of the previous embodiment, and the same effects are obtained.

Figure 9:
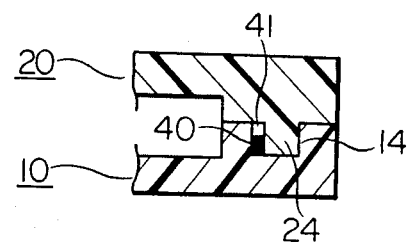
FIG. 9 is a transverse cross-sectional view of a portion of a third embodiment of the present invention.

FIG. 9 is a transverse cross-sectional view of a portion of a third embodiment of the present invention. This embodiment differs from that of FIG. 8 in that the width of the groove 14 of the first package section 10 is such that a gap 41 is formed between the groove 14 and the projection 24 on only one side thereof. This gap 41 provides the same effect as the gaps 41 of the embodiment of FIG. 8 and prevents bonding agent 40 from being forced to the outside of the groove 14 when the projection 24 is inserted. The structure and effects of this embodiment are otherwise the same as that of the first embodiment.

Figure 10:
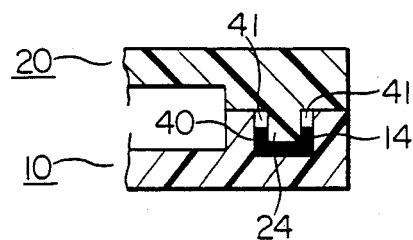
FIG. 10 is a transverse cross-sectional view of a portion of a fourth embodiment of the present invention.

FIG. 10 is a transverse cross-sectional view of a portion of a fourth embodiment of the present invention. This embodiment differs from that of the embodiment of FIG. 8 in that the height of the projection 24 of the second package section 20 is less than the dept of the groove 14 of the first package section 10. Therefore, when the projection 24 is inserted into the groove 14, gaps 41 are formed on all three sides of the projection 24 between it and the groove 14. The gaps 41 provide the same effects as the gaps 41 of the embodiment of FIG. 8. With this structure, intimate contact between the top surfaces 13 and 23 of the package sections is assured, so that there is even less possibility of bonding agent 40 being forced to the outside of the groove 14. The structure of this embodiment is otherwise the same as that of the first embodiment.

Figure 11:
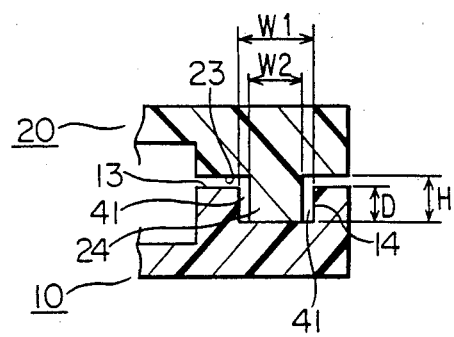
FIG. 11 is a transverse cross-sectional view of a portion of a fifth embodiment of a plastic package in accordance with the present invention before the application of pressure to the two package sections.
Figure 12:
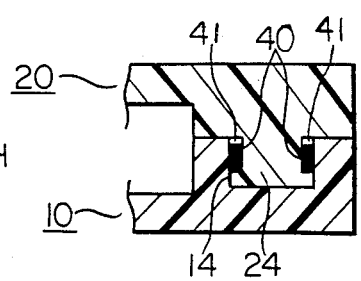
FIG. 12 is a transverse cross-sectional view of the same portion as in FIG. 11 after the application of pressure to the two package sections.

FIGS. 11 and 12 are transverse cross-sectional views of a portion of a fifth embodiment of the present invention. In this embodiment, the width W1 of the groove 14 in the first package section 10 is larger than the initial width W1 (the width prior to the application of pressure) of the projection 24 of the second package section 20, and the depth D of the groove 14 is less than the initial height H of the projection 24. The structure is otherwise identical to that of the first embodiment. When assembling this package, a bonding agent is first applied to the inside of the groove 14 of the first package section 10, and the second package section 20 is stacked atop the first package section 10 with the projection 24 inserted into the groove 14. At this time, there are gaps 41 on both sides of the projection 24 over its entire height and a gap between the confronting top surfaces 13 and 23.

Next, a compressive force is applied to both package sections from the outside to force them towards one another until the top surfaces 13 and 23 intimately contact one another. The compressive force causes the bottom portion of the projection 24 to deform, i.e., to expand and fill the bottom portion of the groove 14. This expansion of the bottom portion of the projection 24 increases the bonding area between the projection 24 and the groove 14 and increases the strength of the bond therebetween. Gaps 41 still remain between the sides of the upper portion of the projection 24 and the sides of the groove 14 so that the bonding agent 40 is not forced out of the groove 14.

In this embodiment, the bonding agent 40 is preferably a solvent such as dope cement (dichloroethane +methyl ethyl ketone +a +a synthetic resin such as an ABS resin) which can dissolve plastic and bond therewith. If such a bonding agent is employed, the bottom end of the projection 24 will be partially dissolved by the bonding agent and will swell. As a result, the tip of the projection 24 can be made to expand as shown in FIG. 12 with the application of a relatively small compressive force to the outside of the package. Not only is the bonding area between the projection 24 and the groove 14 increased, but as the projection 24 locally dissolves, the bottom portion thereof becomes integral with the bottom surface of the groove 14 and an extremely strong bond is obtained.

Figure 13:
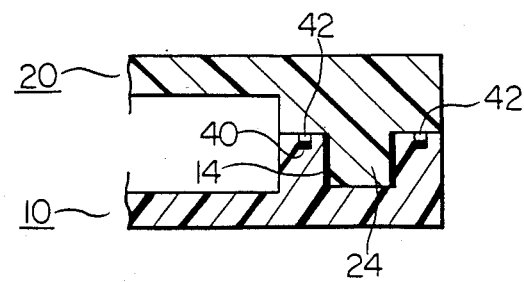
FIG. 13 is a transverse cross-sectional view of a portion of a sixth embodiment of the present invention.

FIG. 13 is a transverse cross-sectional view of a portion of yet another embodiment of this invention. In this embodiment, a pair of grooves 42 is formed in the top surface 13 of the rim 12 of the first package section 10 on either side of groove 14. These grooves 42 extend parallel to groove 14 for its entire length. In the event that bonding agent 40 should be forced out of groove 14 when the projection 24 is inserted into groove 14, the bonding agent 40 accumulates in these grooves 42 and is prevented from spreading to the top surfaces 13 and 23 of the package sections. Such grooves 42 can be employed with any of the preceding embodiments as well. Although these grooves 42 are formed in the first package section 10, it is also possible to form such grooves in the second package section 20 on either side of the projection 24.

In each of the above embodiments, the first engaging portion of the first package section 10 comprises a single rectangular groove, and the second engaging portion of the second package section 20 comprises a single rectangular projection 24. However, it is possible for the first engaging portion to comprise both grooves and projections and for the second engaging portion to comprise both projections and grooves which engage with corresponding grooves and projections of the first engaging portion. Furthermore, although the groove 14 and projection 24 of the above embodiments extend continuously, the engaging portions need not be continuous, and they need not have a rectangular cross section. For example, circular, triangular, polygonal, and wave-shaped depressions and projections may also be employed.

Although a package in accordance with the present invention is intended primarily for use as a package for an IC card, it can also be used as various other types of packages made of materials other than plastic.

What is claimed is:

1. A plastic package for an IC card comprising:
   a first package section which is made of plastic and has a flat base and a rim which projects upwards from one side of said base and extends along the periphery of said base, the top surface of said rim having formed therein a first engaging portion comprising at least one depression;
   a second package section which is made of plastic and has a flat base and a rim which projects upwards from one side of the base of said second package section and extends along the periphery of the base of said second package section, the top surface of the rim of said second package section having formed therein a second engaging portion comprising at least one projection, said first and second package sections being combined with one another with the top surfaces of said rims in intimate contact with one another and with said first and second engaging portions engaged with one another; and
   a bonding agent which is applied to the depression of said first engaging portion before it is engaged with the projection of said second engaging portion, said first and second engaging portions being bonded together by said bonding agent.

2. A plastic package as claimed in claim 1, wherein: said first engaging portion is a continuous groove which extends for substantially the entire length of the top surface of the rim of said first package section; and said second engaging portion is a continuous projection which extends for substantially the entire length of the top surface of the rim of said second package section and which has a transverse cross-sectional shape which is complementary to that of said first engaging portion.

3. A plastic package as claimed in claim 2, wherein said first and second engaging portions have a rectangular transverse cross-sectional shape.

4. A plastic package as claimed in claim 1, wherein:
said first engaging portion further comprises at least one projection; and said second engaging portion further comprises at least one depression which engages with said projection of said first engaging portion.

5. A plastic package as claimed in claim 1, wherein the dimensions of each of said depressions are larger than the dimensions of the corresponding projection by an amount such that a gap will be left between at least one portion of each depression and the corresponding projection and said bonding agent will not be forced out of said depressions when said engaging portions are engaged.

6. A plastic package as claimed in claim 5, wherein:
each of said depressions is a groove having a rectangular transverse cross section and each of said projections has a rectangular transverse cross section which is complementary to that of the corresponding depression; and the width of each depression is greater than the width of the corresponding groove.

7. A plastic package as claimed in claim 6, wherein said gap is formed on both sides of each groove between said groove and the corresponding projection.

8. A plastic package as claimed in claim 6, wherein said gap is formed on only one side of each groove between said groove and the corresponding projection.

9. A plastic package as claimed in claim 6, wherein said gap is formed on both sides of each groove and between the bottom surface of said groove and the end surface of the corresponding projection.

10. A plastic package as claimed in claim 6, wherein the depth of each groove is less than the initial height of the corresponding projection and said top surfaces of said rim are made to contact one another by the application of pressure in the direction normal to said top surfaces, whereby the end of each projection is deformed and expands inside the corresponding groove.

11. A plastic package as claimed in claim 10, wherein said bonding agent is a solvent which can dissolve the plastic of which said first and second package sections are made.

12. A plastic package as claimed in claim 11, wherein said bonding agent is a dope cement.

13. A plastic package as claimed in claim 6, wherein the depth of each groove is substantially the same as the height of the corresponding projection.

14. A plastic package as claimed in claim 6, wherein the depth of each groove is greater than the height of the corresponding projection.

15. A plastic package as claimed in claim 1, further comprising depressions for bonding agent which are formed in the top surface of the rim of one of said first and second package sections on both sides of said first and second engaging portions in the vicinity thereof, said depression for bonding agent being sufficiently large to hold any bonding agent which is forced out from said engaging portions when said engaging portions are engaged.

16. A plastic package as claimed in claim 4, wherein the dimensions of each of said depressions are larger than the dimensions of the corresponding projection by an amount such that a gap will be left between at least one portion of each depression and the corresponding projection and said bonding agent will not be forced out of said depressions when said engaging portions are engaged.

* * * * *